UNITED STATES PATENT OFFICE.

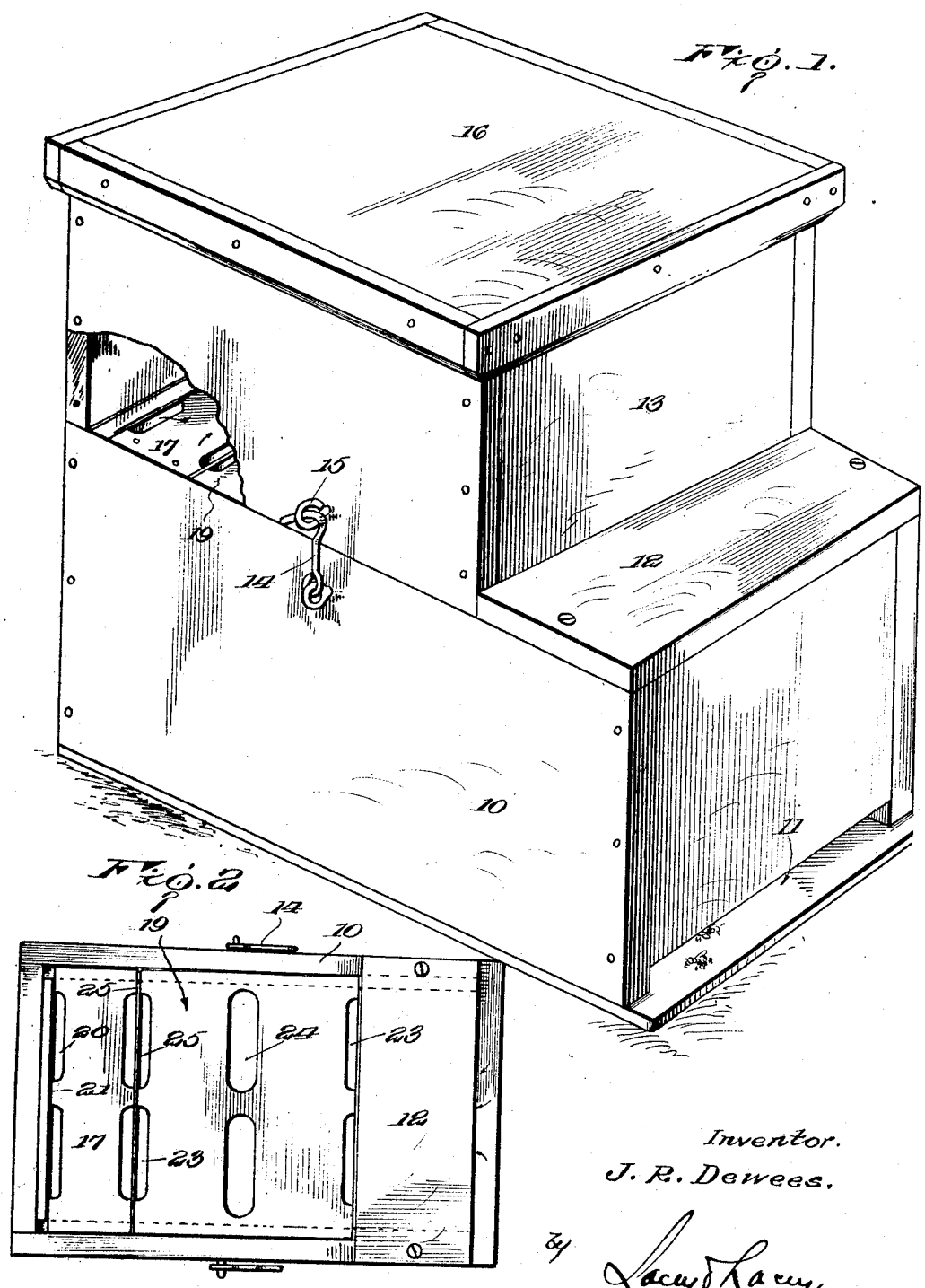

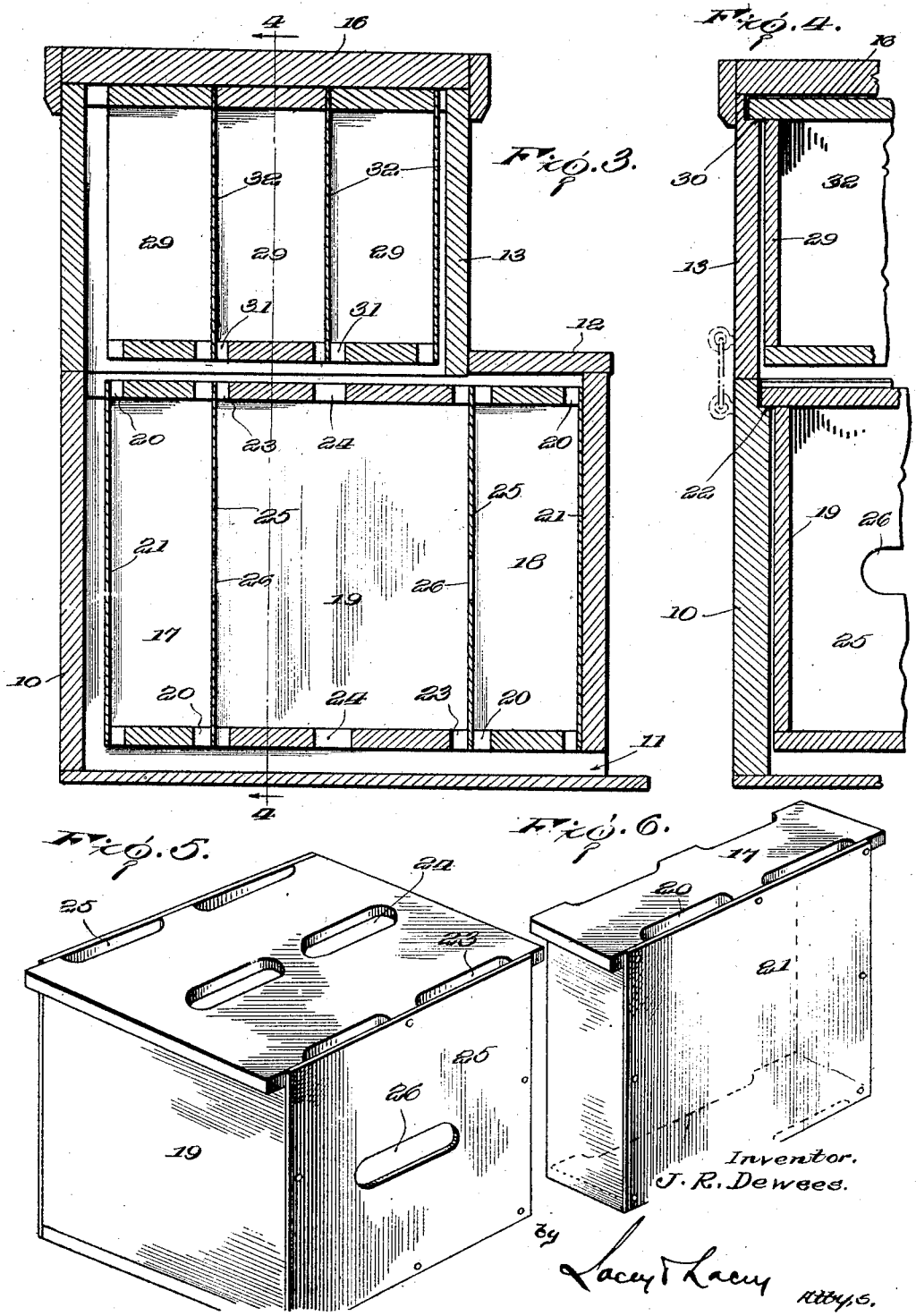

JAMES ROBERT DEWEES, OF BANCROFT, WEST VIRGINIA.

BEEHIVE.

1,382,068.	Specification of Letters Patent.	Patented June 21, 1921.

Application filed February 18, 1920. Serial No. 359,831.

*To all whom it may concern:*

Be it known that I, JAMES ROBERT DEWEES, a citizen of the United States, residing at Bancroft, in the county of Putnam and State of West Virginia, have invented certain new and useful Improvements in Beehives, of which the following is a specification.

This invention relates to an improved bee hive and controller and has as one of its principal objects to provide a construction wherein the bees will be prevented from adhering the frames to the walls of the brood case or super so that the frames may accordingly be readily removed.

The invention has as a further object to provide a bee hive and controller wherein the bees will be prevented from building comb in a direction across the frames to thus unite several frames.

And the invention has as a still further object to provide an improved type of frame so constructed that the bees will be forced to build an individual comb for each frame so that breaking of the comb in removing the frames will be obviated.

Other and incidental objects will appear hereinafter.

In the drawings:

Figure 1 is a perspective view of my improved bee hive,

Fig. 2 is a plan view of the brood case of the hive, the super being removed,

Fig. 3 is a longitudinal section taken centrally through the hive,

Fig. 4 is a vertical section taken on the line 4—4 of Fig. 3 and looking in the direction of the arrows, Fig. 5 is a detail perspective view showing the queen box of the brood case, and Fig. 6 is a detail perspective view showing one of the frames.

In carrying the invention into effect, I employ a preferably oblong brood case 10 provided at its front end with an entrance 11. Closing the forward portion of the brood case at its upper side is a top strip 12 and mating with the brood case to abut at its forward end with said strip is a super 13. The brood case is preferably equipped with hooks 14 connected to the side walls of the case and engageable in eyes 15 carried by the side walls of the super for thus firmly securing the super upon the brood case. Closing the super at its upper end is a removable cover 16.

Mounted within the brood case 10 are brood frames 17 and 18 and a queen box 19. Two of said frames are shown in the present instance and a single queen box but it, of course, will be understood that the size of the brood case may be varied as desired to accommodate a greater number of frames and more than one queen box. The frames 17 and 18 are identical in construction and in Fig. 6 one of said frames is shown in detail. As there illustrated, the frames include top, bottom and end strips and the top and bottom strips are cut away to provide passages 20 for the bees. Closing each of said frames at one side is a side wall 21 and, as will now be observed upon reference to Fig. 4, the side walls of the brood case are, at their upper margins, provided with ledges 22 with which are engaged the overhanging ends of the top strips of said frames for supporting the frames within the brood case. The frames are of a length to be snugly received between the side walls of the brood case and, as will be noted, clearance is provided between the bottoms of the frames and the bottom wall of the brood case in order that the bees may enter beneath the frames. The queen box 19, as in the instance of the frames 17 and 18, is formed with top, bottom and end strips and the top and bottom strips of said box are cut away at their side edges to form bee passages 23. Said strips are further each provided medially with a pair of passages 24. Closing the box 19 at its sides are side walls 25 and formed through said walls are passages 26 through which bees may enter. The overhanging ends of the top strip of the queen box are engaged with the ledges 22 of the brood case for supporting the box therein and as will now be observed upon reference to Fig. 3, the queen box is received between the frames 17 and 18. Owing to the presence of the side walls 21 of the frames the bees will be prevented from building comb in said frames in such manner that the comb will be attached to the front and rear walls of the brood case and owing to the presence of the side walls 25 of the queen box, the bees will be further prevented from building comb within the frames to extend into said box nor can comb be built in the queen box to extend into the frames. Consequently, in removing either of the frames or the queen box, breaking of the comb, such as would occur were the comb to extend from either frame into the box or vice versa, will be obviated. As will be noted, clearance between the frame 17 and the rear wall of the brood case is provided in order that bees may have free access to the super.

Removably fitted within the super 13 is a plurality of honey frames 29. These frames are substantially identical with the frames 17 and 18 previously described and comprise top, bottom and end strips, the overhanging ends of the top strips being engaged with ledges 30 in the side walls of the super for supporting the frames therein. The top strips of the frames 29 are preferably without passages. However, the bottom strips of said frames are cut away at their side edges to provide passages 31. Closing one side of each of said frames is a side wall 32. The bees will thus be prevented from building comb to extend from one frame into the other. Breaking of the comb from this cause when the frames are removed will accordingly be obviated. As will, of course, be understood, the frames fit snugly between the side walls of the super and while I have shown the use of but three of the frames 29, still, as will be appreciated, the size of the super may be varied in different hives for accommodating a greater number of frames.

Having thus described the invention, what is claimed as new is:

1. A bee hive including a casing, and a plurality of frames mounted within the casing and provided with individual imperforate side walls respectively closing each of the frames at one side thereof.

2. In a bee hive, a frame including top, bottom and end strips, and an imperforate side wall secured to said strips and closing the frame at one side, there being a bee passage formed through the bottom strip.

3. A bee hive including a brood case, and a queen box mounted in said case and formed with solid top, bottom, side and end walls, there being bee passages formed medially through the side walls and other bee passages formed through the top and bottom walls.

In testimony whereof I affix my signature.

JAMES ROBERT DEWEES. [L. s.]